United States Patent [19]

Tong

[11] Patent Number: 4,687,626

[45] Date of Patent: Aug. 18, 1987

[54] PASSIVE SAFETY DEVICE FOR EMERGENCY STEAM DUMP AND HEAT REMOVAL FOR STEAM GENERATORS IN NUCLEAR POWER REACTORS

[76] Inventor: Long S. Tong, 9733 Lookout Pl., Gaithersburg, Md. 20879

[21] Appl. No.: 692,568

[22] Filed: Jan. 18, 1985

[51] Int. Cl.⁴ .............................................. G21C 9/00
[52] U.S. Cl. ................... 376/298; 60/644.1; 60/646; 60/657; 376/283
[58] Field of Search ............... 376/282, 283, 298, 299; 60/644.1, 646, 657

[56] References Cited

U.S. PATENT DOCUMENTS

| | | |
|---|---|---|
| 3,290,222 | 12/1966 | Schoessow et al. |
| 3,454,466 | 7/1969 | Pitt et al. |
| 4,022,655 | 5/1977 | Gaouditz et al. |
| 4,033,814 | 7/1977 | Bregeon et al. .................. 376/298 |
| 4,051,892 | 10/1977 | Reinsch ............................. 376/282 |
| 4,138,318 | 2/1979 | Speelman ......................... 376/299 |
| 4,280,796 | 7/1981 | Reinsch ............................. 376/282 |
| 4,440,719 | 4/1984 | Howard ............................ 376/282 |
| 4,567,016 | 1/1986 | Tong ................................. 376/283 |

FOREIGN PATENT DOCUMENTS

| | | | |
|---|---|---|---|
| 3005643 | 8/1981 | Fed. Rep. of Germany | 376/282 |
| 3039227 | 5/1982 | Fed. Rep. of Germany | 376/283 |

Primary Examiner—Deborah L. Kyle
Assistant Examiner—Richard W. Wendtland

[57] ABSTRACT

The present invention provides a passive safety device for dumping steam from the steam generator of a nuclear power reactor in case of emergencies. The device comprises a steam ejector immersed in a storage tank of coolant water, a conduit connecting the steam ejector to the steam line from the steam generator, a heat exchanger having its inlet connected to the outlet of the steam ejector and the outlet to the storage tank, and a coolant pool in which the heat exchanger is immersed. Optionally, the output from the steam ejector may be connected to the feedwater line to the steam generator as an emergency feedwater supply.

3 Claims, 1 Drawing Figure

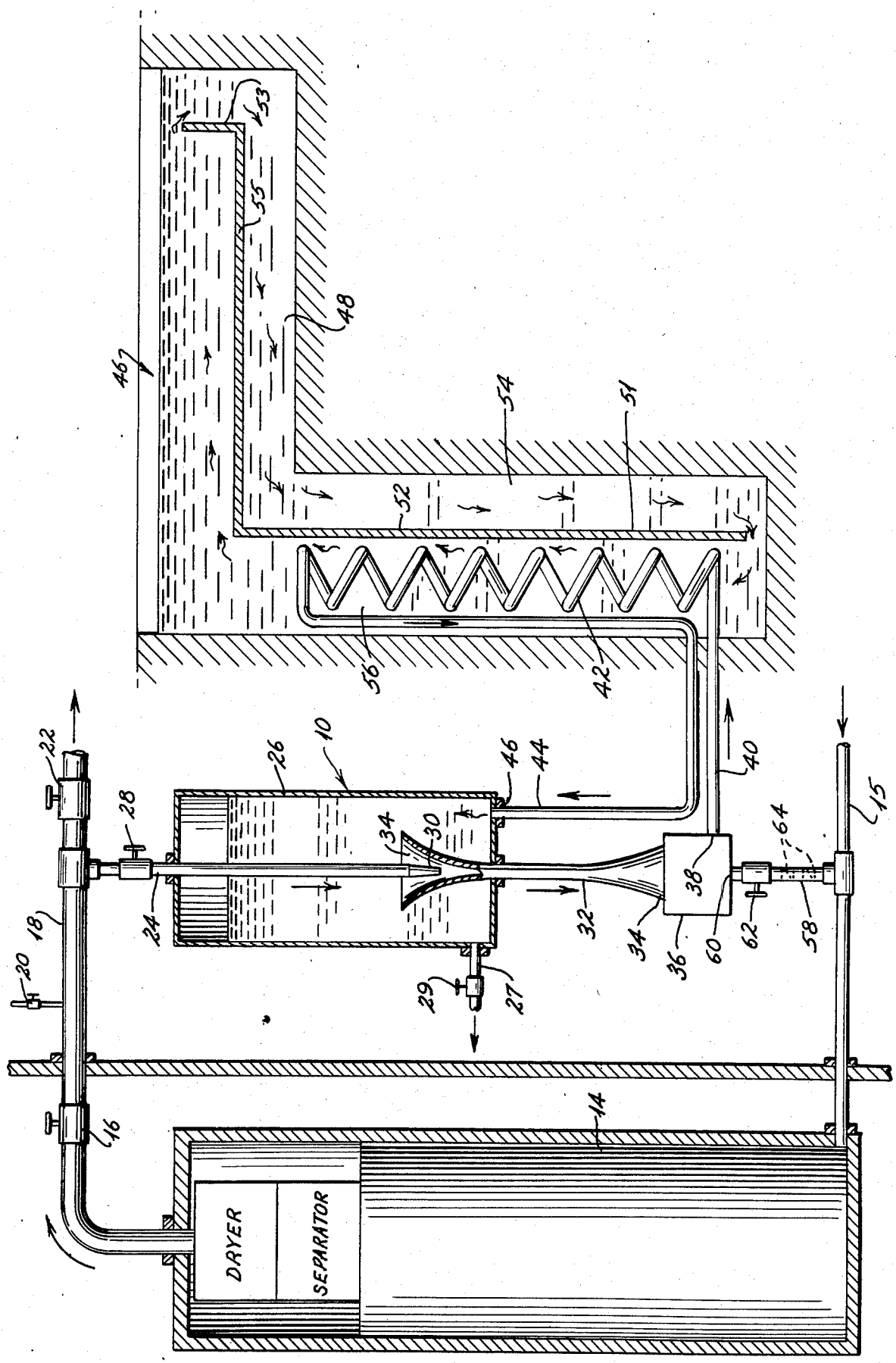

PASSIVE SAFETY DEVICE FOR EMERGENCY STEAM DUMP AND HEAT REMOVAL FOR STEAM GENERATORS IN NUCLEAR POWER REACTORS

BACKGROUND OF THE INVENTION

1. Field of the Invention

The present invention is directed to nuclear power reactors. More specifically, this invention is related to a safety device for nuclear power reactors.

2. Description of the Prior Art

In a conventional nuclear power reactor system, the reactor and the steam generator connected thereto are situated within a containment wall. The steam so generated is fed via a pipe through the containment wall to drive a steam turbine for power generation. Typically, to guard against over pressurization within the pipe, steam safety valves and steam release valves are put on line. Thus, in the event of a rupture in the pipe, the main steam isolation valve is closed and high pressure steam is released or dumped into the surrounding atmosphere through the steam release valves. Such a release into the atmosphere runs the risk of releasing radioactive materials into the air, particularly if some of the tubes in the steam generator in the nuclear reactor should rupture simultaneously. Hence, there is a need for a passive emergency steam dumping system to be used in connection with nuclear reactors. By passive, it is meant devices which will perform its assigned duty even when electric power is not available.

Furthermore, when there is a total loss of electric power coupled with a steam line break, removal of the residual heat in the steam generator and the emergency auxiliary feedwater system will need an uninterrupted power source to circulate cold water to condense the steam and to supply the auxiliary feed water. Although emergency generators can be used as a back-up in case of power failure, it would be highly preferable to have a passive system whereby the energy in the high pressure steam from the steam generator is converted into mechanical energy for heat removal and circulation of emergency feedwater. Since passive systems do not require an energy source as a driving force, the presence of such a passive system for use during power failures is clearly desirable.

SUMMARY OF THE INVENTION

According to the present invention, a passive emergency steam dump for nuclear power reactors is provided which comprises:
- a first storage means for coolant water;
- a steam jet ejector disposed in the first storage means, the operating steam for the ejector being supplied by the steam generator;
- a heat exchange means having its inlet connected to the outlet of the steam jet ejector and the outlet, to the first storage means; and
- a second storage means for coolant water in which the heat exchanger is immersed.

In another embodiment of the subject invention, the outlet of the steam jet ejector is also connected to the main feedwater line for the steam generator for returning condensate from the steam jet ejector to the steam generator when the pressure in the outlet exceeds a specified limit.

BRIEF DESCRIPTION OF THE DRAWING

FIG. 1 illustrates the cross-sectional view of the emergency steam dump of the present invention.

DETAILED DESCRIPTION OF THE INVENTION

The present invention provides a safety device for dumping steam from a steam generator in a nuclear power reactor, removing residual heat from the steam generator and providing the steam generator with feedwater during emergencies such as steam line rupture and/or power failure.

As shown in FIG. 1, reference numeral 10 generally refers to the safety device of the present invention which is located outside the containment wall 12 for steam generator 14 which is connected to a nuclear power reactor (not shown). Steam from generator 14 is fed through valve 16 and containment wall 12 to drive steam turbines (not shown) via main steam line 18. Outside containment wall 12, main steam line 18 is provided with steam safety valve 20. Downsteam from safety valve 20, steam isolation valve 22 is provided on main steam line 18. Between valves 18 and 22, branch pipe 24 feeds steam in main steam line 18 into cold water storage tank 26 through steam relief valve 28. The lower end of line 24 is formed into a nozzle or steam jet 30 for the ejection of high pressure steam into diffuser body 32. Inlet 34 of diffuser body 32 is in the form of an inverted bell for the suction of cold water in storage tank 26 into diffuser body 32. Discharge 34 of diffuser body 32 is in fluid communication with chamber 36 where the condensed steam in the form of a subcooled water is stored. Chamber 36 is provided with exit 38 which is connected to the entrance 40 of a heat exchange device. Typically, the heat exchange device is a cooling coil 42 which provides a large surface area for optimal heat transfer. The outlet 44 of cooling coil 42 is connected to inlet port 46 in storage tank 26. Thus, hot steam condensatae flows from chamber 36 through outlet 38 and inlet 40 into cooling coil 42, leaves the coil through outlet 44 and into storage tank 26. To prevent excessive build-up of cooling water in storage tank 26, a drain pipe controlled by valve 29 is provided in storage tank 26. Cooling coil 42 is submerged in cold water storage tank 50 for heat exchange between the hot condensate within the coil and the cold water stored in pool 46. The volume of coolant water stored in pool 46 should be sufficiently large so as to allow optimal cooling of the coil 42.

In a preferred embodiment, pool 46 is in the shape of an inverted L, i.e. one comprising a horizontal portion 48 and vertical portion 50. In FIG. 1, cooling coil 42 is placed within the vertical section in pool 50 which is divided into two connecting chambers by baffle 52. Baffle 52 comprises a long vertical section 51, a short vertical section 53 and a horizontal section 55 connecting the two vertical sections 51 and 53. Baffle 52 is completely under the waterline in pool 46. The baffle forms two chambers 54 and 56 in pool 46 which are in fluid communication. Cooling coil 42 is placed in the vertical portion of chamber 56.

In order to permit device 10 to function as an emergency feedwater source to steam generator 14, chamber 36 is optionally connected to main feedwater line 15 to steam generator 14 via pipe 58 and exit 60. Emergency feedwater valve 62 is located downstream from exit 60 in pipe 58. Check valves 64 prevent the flow of feedwater from line 15 into chamber 36. Emergency feedwater valve 62 is opened when the pressure within chamber 36 exceeds a specified limit.

In operation, when there is a rupture in the main steam line downstream from steam isolation valve 22, valve 22 is closed to direct the flow of steam into device 10 of the present invention. When the pressure within line 18 exceeds a specific value, steam relief valve 28 opens, thus allowing high pressure steam to flow through nozzle 30 as a strong steam jet. The flow of the steam from nozzle 30 into diffuser body 32 causes cold water in storage tank 26 to be entrained and drawn into diffuser body 32. The steam is condensed and is collected in chamber 36 as subcooled water. As more steam enters diffuser body 32, the condensate is forced into inlet 40 of cooling coil 42 submerged in cooling water pool 48. The condensate flows up coil 42, through outlet 44 and inlet 46 into storage tank 26. Heat in the condensate is dissipated to the cooling water in chamber 56 of pool 54. As a result, when the condensate enters storage tank 26, its temperature is much lower than the condensate in chamber 36. Due to the transfer of heat into chamber 56, the water therein rises as a result of the increase in temperature. Consequently, the water in pool 48 is caused to circulate by flowing upwardly and then horizontally in chamber 56 over short vertical section of baffle 53 into chamber 54 where it flows horizontally and then vertically down past the lower end of long vertical section 51 of baffle 52 into chamber 56. Due to this circulation, the cooling water loses the heat it absorbs from cooling coil 42 so that when the water enters chamber 56, the temperature of the water has dropped significantly and can be used to absorb heat from cooling. coil 42 again. Accordingly, the steam from main steam line 18 can be safely dumped into safety device 10, a closed system, without the risk of harming the surrounding atmosphere. In addition, the residual heat in the steam generator can be dissipated through device 10 which requires no power source to operate, i.e. a passive system. Hence, in the event of a total alternating current power failure, the present safety device 10 offers a back-up cooling system which will operate without power. Valves 20, 22, 24 and 62 can be pressure-operated or direct current operated so as to render device totally independent of alternating current power.

The present device can also provide emergency feedwater to the steam generator. When the pressure in chamber 36 exceeds a specified value, valve 62 opens, thus allowing the condensate stored therein to flow through check valves 64 and pipe 15 and into steam generator 14 as feedwater.

What is claimed is:

1. In a pressurized water nuclear power reactor having at least one steam generator with a main feedwater line, a passive emergency steam dump comprising:

a first storage means for coolant water, the storage means having a drainage means to prevent excessive build-up of coolant water therein;

a steam jet ejector disposed within the first storage means and immersed in the coolant water the steam jet ejector having an inlet and an outlet;

means for feeding pressurized steam from the steam generator of a nuclear power reactor into the steam jet ejector;

heat exchange means for cooling the hot condensate from the steam jet ejector, the heat exchange means having an inlet and an outlet, the inlet of the heat exchanger means being connected to the outlet of the steam jet ejector, and the outlet of the heat exchange means being connected to the first storage means; and a second storage means for coolant water in which the heat exchange means is immersed.

2. The passive emergency steam dump of claim 1 wherein the outlet of the steam jet ejector is also connected to the main feedwater line for the steam generator for returning condensate from the steam jet ejector to the steam generator when the pressure in the outlet exceeds a specified limit.

3. The passive emergency dump of claim 1 wherein the second storage means comprises an inverted L-shaped pool, a baffle being disposed within the pool to divide the pool into two compartments which are in fluid communication, the heat exchange means being stored in one of the vertical compartments in the pool.

* * * * *